March 26, 1935. T. H. SYMINGTON 1,995,784
LATERAL MOTION TRUCK
Filed July 30, 1930 3 Sheets-Sheet 3
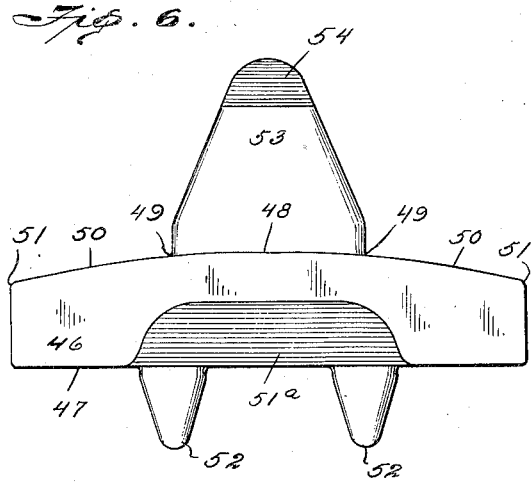
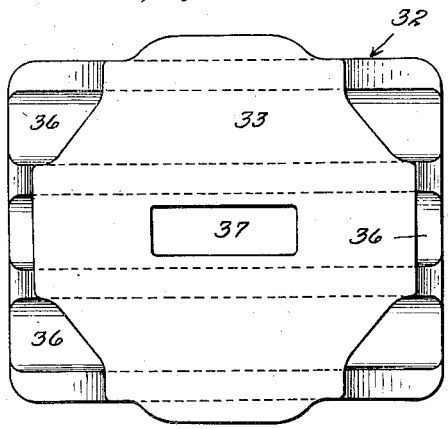
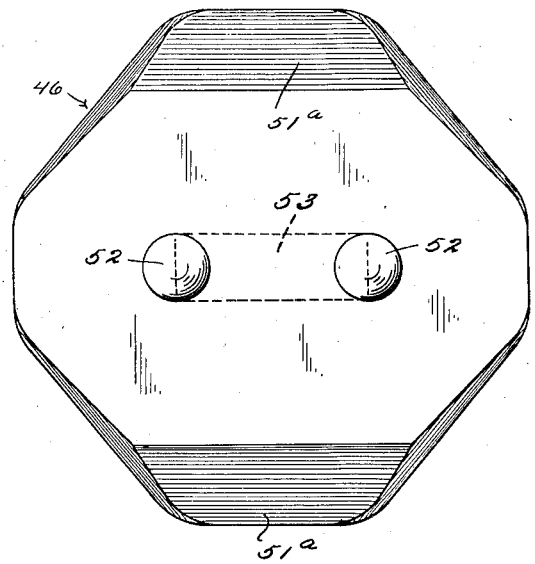
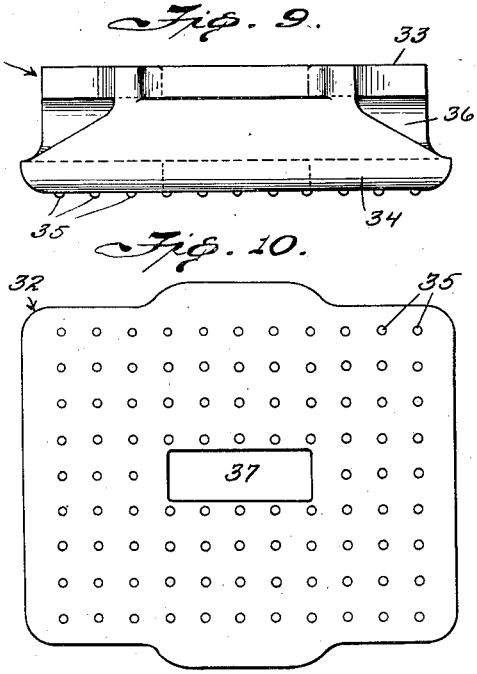
Inventor
Thomas H. Symington
By John Milton Jester
Attorney Patented Mar. 26, 1935

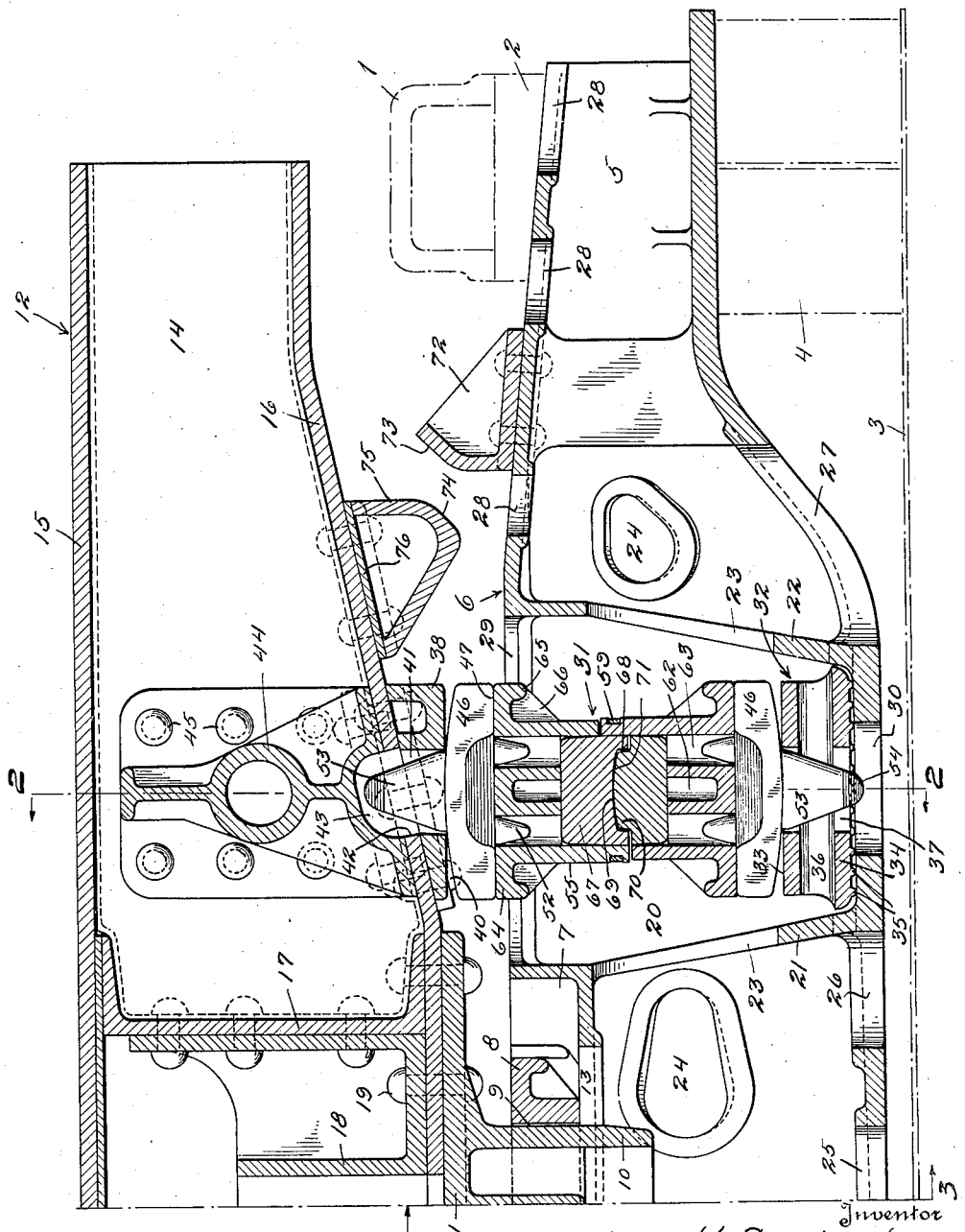

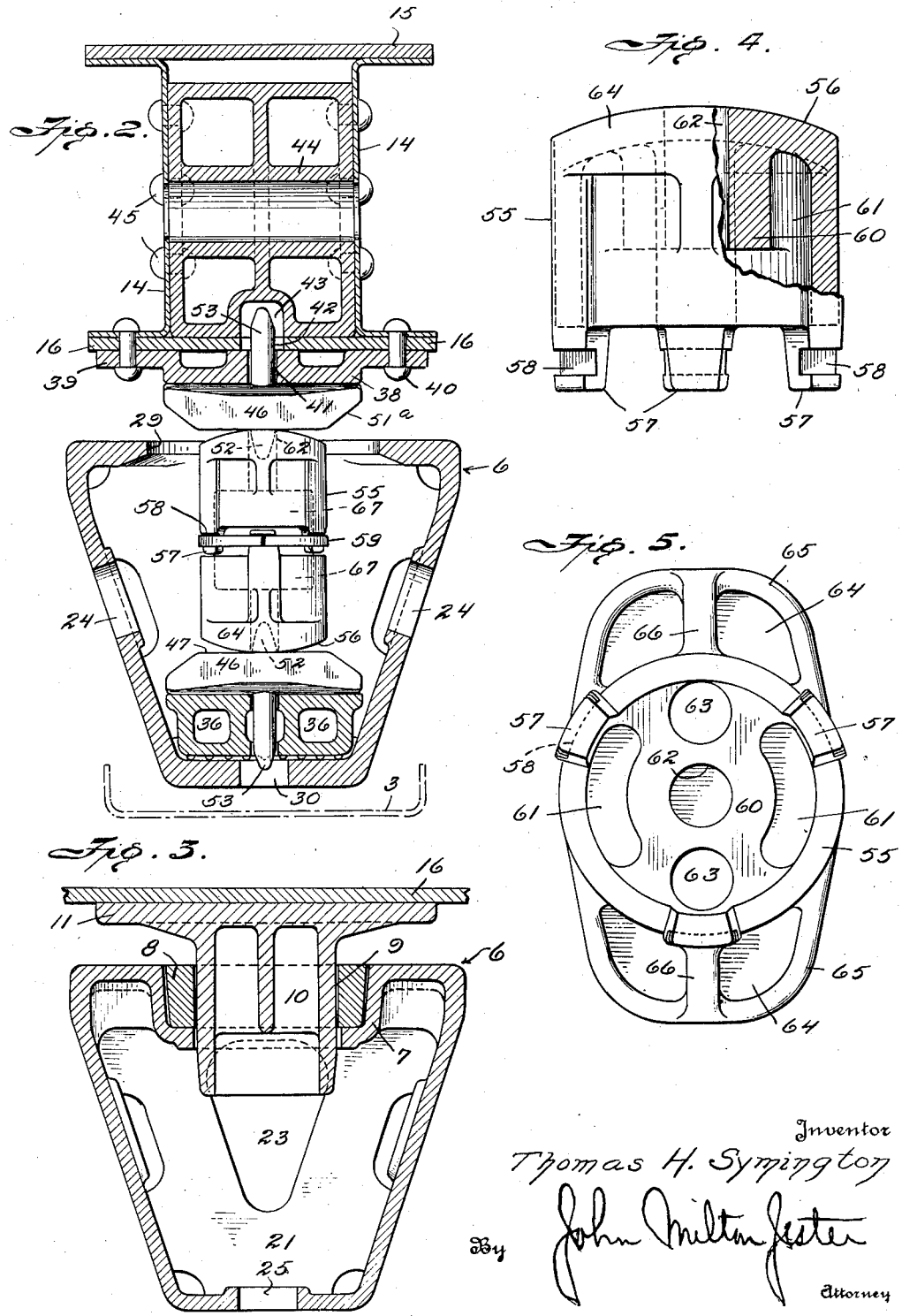

1,995,784

UNITED STATES PATENT OFFICE 1,995,784

LATERAL MOTION TRUCK

Thomas H. Symington, Baltimore, Md., assignor to T. H. Symington & Son, Inc., Baltimore, Md., a corporation of Maryland Application July 30, 1930, Serial No. 471,342

18 Claims. (Cl. 308—224)

The invention relates to railway car trucks, particularly to those designed for use in connection with freight cars, and has for its general object the provision of an improved truck embodying a novel bolster mounting whereby to permit relative swiveling movement of the truck and body bolster and at the same time to permit lateral motion of the body bolster.

It is well known that it is a common practice to provide a truck with rockers or rollers carried by the truck bolster and supporting the body bolster in such manner that the latter may have the combination of movements above mentioned. However, it has been attempted by various means to insure squaring of the wheels with respect to the truck and return of the body bolster to its normal or centered position with respect to the truck bolster after swiveling movement or lateral motion has occurred. The various expedients adopted for the purpose have been found to be faulty for the reason that too great a resistance is initially offered to either swiveling movement or lateral motion, this resulting in a tendency of the parts to slam after the resistance has been overcome, it frequently occurring that the body bolster moves with excessive violence toward one side frame or the other, as the case may be, depending upon the direction of curvature of the track. The violence of these movements is extremely detrimental not only to the parts of the truck itself but also to the car lading, especially in case the latter is of a perishable nature. In connection with passenger cars the problem is easily solved by a peculiar suspension means which can be employed but these methods cannot be followed in connection with freight car equipment.

It is with the above facts in view that I have devised the present invention, which has for an important object the provision of a truck embodying a rocker supporting means for the body bolster which will have the same general action as the suspension means in a passenger car truck, the rocker arrangement being such as to exert a lifting effect upon the body bolster when lateral motion occurs, this lifting effect counteracting the tendency of the body bolster to move.

A very important object of the invention is to provide a lateral motion truck embodying side bearing rockers of peculiar construction involving relatively rotatable parts or sections so that the inevitable torsional action, upon the occurrence of swiveling movement will occur within the interior of the side bearing assemblies, thus greatly reducing, if not entirely eliminating, any appreciable degree of friction between the side bearings themselves as a whole and the truck and body bolsters.

Another object of the invention is to provide a lateral motion truck in which the co-acting relatively movable parts, sections or elements of the side bearing rockers or rocker assemblies are so constructed as to be incapable of binding, the contacting surfaces thereof being of such specific formation that the lines of stress will always fall within the interior of the rocker assemblies and so shaped as to reduce the frictional area to the minimum, thus insuring freedom of movement so that a true floating action will be had.

Another object is to provide a truck structure in which the actual work done by the peculiar rocker arrangement will be the same regardless of whether all four rockers for a car are sustaining the load or whether only three rockers are actually in service as of course occurs in the event that the car is standing upon uneven track for instance at the approach to or take-off from a curve.

A further object is to provide a truck of this character in which free lateral motion of the body bolster is permitted in both directions for a portion of the travel, the lift or elevation of the body bolster being initially comparatively slight, and in which throughout the remainder of the travel the lift will become increasingly abrupt so that gravity will oppose the centrifugal force developed as for example when the car rounds a curve or the wheels on one side pass over a low spot in the rail.

A more specific object is to provide a truck construction embodying counterpart rocker elements forming part of the side bearing assembly, one rocker element having a bearing within the truck bolster and the other having a bearing engagement with the body bolster, these two elements being always maintained in non-rotative relation to the respective bolsters and having interposed between them the relatively rotatable parts which take care of all torsional strains.

Another detailed object is the provision of an arrangement of this character in which the torsional friction taking elements are removable if for any reason unexpected wear should make it desirable.

Another, and rather important, object is to provide a lateral motion truck in which the side bearing assemblies are located closer to the longitudinal axis of the car than is ordinarily considered the standard practice, the reason being to maintain a four point bearing for the car body at least most of the time or, in other words, to reduce the frequency of the occasions when the load is sustained upon only three bearings, the slight reduction in stability being more than compensated for by the provision of safety stop means adapted to come into play in the event of an unusually violent lateral motion such as might conceivably result from numerous causes.

An additional object is to provide a structure of this character which will in most respects, at least in so far as the mere truck and body bolsters are concerned, not constitute a radical departure from previous designs so that it will be unnecessary to make any changes in the car underframe or the side frames, it being even possible to make use of a standard body bolster by the simple expedient of adding but a few parts thereto.

An additional object is to provide a truck embodying all of the above advantageous characteristics and which will at the same time be comparatively simple and inexpensive to make, easy to assemble, particularly as the parts are reversible and interchangeable, which will be efficient and durable in service, positive in action, and a general improvement in the art.

To the attainment of the foregoing and other objects and advantages, the invention preferably consists in the details of construction and the arrangement and combination of parts to be hereinafter more fully described and claimed, and illustrated in the accompanying drawings in which:

Figure 1 is a vertical longitudinal section through one half of a truck and body bolster assembly and showing my novel side bearing arrangement therein.

Figure 2 is a vertical cross sectional view taken on the line 2—2 of Figure 1,

Figure 3 is a vertical cross section taken on the line 3—3 of Figure 1,

Figure 4 is a view partly in elevation and partly in section of one of the relatively rotatable sections or elements of the side bearing assembly, Figure 5 is a plan view thereof, Figure 6 is a detail side elevation of one of the counterpart upper and lower rocker elements, Figure 7 is a plan view thereof, Figure 8 is a top plan view of the bottom stationary bearing member, Figure 9 is a side elevation thereof, and Figure 10 is a bottom plan view thereof.

Referring more particularly to the drawings, the numeral 1 designates a truck side frame having the usual window opening 2 within the bottom of which is the spring plank 3 supporting the truck springs, diagrammatically indicated at 4, which in turn support the ends 5 of the truck bolster 6. This bolster may of course have its precise construction varied within considerable limits though naturally it is formed as a casting and has its central or intermediate portion of much greater depth than its ends 5, the latter being reduced in height so as to cooperate properly with the springs 4 while remaining in the proper relation to the window opening 2. At its center the truck bolster is shown as provided with a guideway 7 elongated longitudinally of the bolster for the accommodation of a slidable bearing member 8 which is formed with a central cylindrical opening 9 for rotatably receiving a trunnion member 10 depending from a center plate 11 secured to the underside of the body bolster 12. The bottom of the guideway 7 is disclosed as having an elongated slot 13 therein accommodating and permitting movement of the trunnion member 10. The purpose of this particular construction at the center is to permit relative swivelling movement of the truck and body bolsters and at the same time to permit lateral motion of the body bolster.

There need be nothing particularly unusual about the construction of the body bolster and it is here shown as including channeled side members 14 secured, as by rivets or the like to top and bottom plates 15 and 16, the central portion being reinforced by transverse channel irons 17 between which is riveted a bracing casting 18. In the arrangement disclosed the center plate 11 is secured not only to the bottom plate 16 but also to the casting 18 and channel irons 17 by means of rivets 19. The purpose of this detailed construction is simply to provide strength so that the body bolster will be capable of withstanding any cantilever strains imposed upon it in service.

Reverting to the truck bolster, it will be observed that in spaced relation to each side of the center thereof it is formed with a sprocket 20 which extends preferably the full height or depth and which may be said to be of inverted frusto-pyramidal shape. In other words the major portion, at least, of the truck bolster is of less width at its bottom than at its top, its sides diverging upwardly and outwardly as clearly indicated in Figure 2. The other two sides of the pocket are defined by wall members 21 and 22 which likewise diverge upwardly and which merge into the bottom wall and into the guideway 7 and top of the bolster, respectively. These wall members 21 and 22 may be formed with openings 23 for the sake of lightness and it is equally apparent that the sides of the bolster may be formed with other openings 24 and its bottom with openings 25, 26 and 27, all for the same purpose. Other openings 28 may be provided in the top for reducing the weight. The exact size, shape and number of any and all such openings may be varied within considerable limits as this is merely a manufacturing detail governed by foundry practice. The top of each pocket is of course open at 29 and the bottom is also formed with an opening 30, the latter being principally for the purpose of permitting the escape of any dirt or water which might otherwise accumulate within the pocket. The entire purpose of the pocket structure is to contain and substantially enclose the side bearing assembly which is indicated as a whole by the numeral 31. In some respects, at least, the truck and body bolsters themselves may resemble the corresponding parts in my co-pending application for patent for Lateral motion truck, filed December 2, 1929 and given Serial No. 411,093 but it will be observed, as the description progresses, that the side bearing structure is a radical departure in every respect.

Each side bearing assembly is described as comprising a stationary lower bearing member 32 illustrated in detail in Figures 8, 9 and 10 and of general substantially rectangular shape so as to fit within the bottom of the pocket 20. This member need not be of solid construction, though it can be if preferred, as it is here shown as comprising a plane upper bearing surface 33 and a lower bearing surface 34, the latter being preferably provided with a series of slight projections 35 engaging upon the upper surface of the bottom of the pocket providing adequate support without having continuous contact. This member is also represented as cored out at 36 for the sake of lightness. Moreover the top bearing surface 33 may be of less extent than the bottom 34 for the sole purpose of reducing the amount of metal. In addition, this stationary bearing member is represented as formed centrally with an elongated opening 37 for a purpose to be described.

Secured on the underside of the body bolster 12 vertically above the pocket 20 and of course the member 32 therein is a bearing member 38 here disclosed as having lateral flanges 39 riveted at 40 to the bottom plate 16 and the channeled sides 14 of the body bolster. This member 38 is formed with an opening 41 corresponding in size and shape to the opening 37 and registering with an opening 42 in the bottom plate 16 which in turn communicates with a recess or cavity 43 in the lower end of a reinforcing casting 44 which is located within and secured to the body bolster. This member preferably extends from side to side of the body bolster and is preferably riveted to the channels 14 as shown at 45. The load comes upon the bearing member 38 and it is consequently obvious that the body bolster must be strong at this point, hence the provision of the reinforcing casting 44.

The rocker means is interposed between the stationary bearing member 32 and the bearing 38 and this assembly comprises counterpart rocker members 46 arranged in reversed or opposed relation and having their confronting faces 47 plane and their outermost or most remote surfaces curved, the curved surface 48 between the points 49 being of less radius than the surfaces 50 between the points 49 and the outer ends 51, for a reason to be hereinafter explained. The edges of the plane sides may be beveled off as at 51ª to reduce the weight, and these plane sides are formed each with a pair of spuds 52 while each curved side is formed with a single central spud 53, the extremity of which may be beveled off as at 54. The lower rocker member 46 has its curved surface rockable longitudinally of the truck bolster upon the plane top surface 33 of the bearing member 32, its spud 53 being accommodated within the opening 37, while the upper rocker member 46 has its curved surface rockable longitudinally of the body bolster upon the plane lower surface of the bearing member 38, its spud 53 being received within the openings 41 and 42 and recess 43. Owing to the substantially rectangular and elongated shape of the openings 37, 41 and 42 it is apparent that the rocker members 46 will be restrained against any rotative movement or twisting with respect to the bearing surfaces with which they cooperate, the movement of the lower and upper members 46 being confined to one longitudinally of the truck and body bolsters, respectively.

The torsion permitting means comprises a pair of combined retaining and load taking members 55 arranged in spaced end to end relation between the rocker members 46 and capable of rotary movement with respect to each other but incapable of rotary movement with respect to the associated and adjacent rocker members. These members 55 are disclosed as having cylindrically curved outer surfaces 56 bearing against the plane surfaces of the rockers 46, their inner or adjacent ends being formed with loosely interfitting fingers 57 grooved at their outer sides as shown at 58 for the reception of a split spring ring 59, the split of which is intended to be welded or otherwise suitably closed after assembly of the parts. Each member 55 is partly hollow, or in other words is recessed at its open end, there being a solid portion 60 throughout substantially half of its length. The word "solid" is used not in its strictest or most literal meaning but in the sense that there is provided a column or post which will sustain the load, as actually the portion 60 may be partially cored out as at 61 and 62 not only to reduce the weight but also to insure a better casting, as will be readily understood. The portion 60 of each member 55 is also provided with openings 63 which receive and accommodate the spuds 52 so that each member 55 will be restrained against any torsional movement with respect to the rocker member 46 engaged by it. The closed or outer ends of the members 55 are preferably widened or formed with lateral projections 64 so as to have adequate bearing against the associated members 46 and these lateral extensions are preferably provided with peripheral stiffening beads 65 into which merge webs 66 in turn merging into the sides of the members 55 as clearly indicated in Figure 1 and also in Figure 5. Located within the hollow adjacent end portions of the members 55 are bearing blocks 67 which have plane or flat surfaces resting upon the solid or column portions 60 and which fit reasonably snugly within the members 55 so as to be incapable of any appreciable lateral movement therein except possibly a very slight amount to permit them to equalize pressures brought upon them and to accommodate themselves to the line of pressure. One block 67 is formed with a substantially cylindrical recess or cavity 68 having a spherical bottom 69, while the other is formed with a substantially cylindrical projection 70 having a spherical surface 71 struck from a radius less than that of the surface 69, the reason being to reduce the areas in contact. In actual practice the contacting areas may be of very slight extent, possibly an inch or a little more in diameter. The advantage in this is to reduce friction so that the blocks 67 confined within their retainers may rotate with respect to each other without undue resistance, thereby insuring freedom of movement of the body bolster with respect to the truck bolster at all times when there is any force tending to move the bolsters relatively. It should also be observed that there is a slight space between the periphery of the projection 70 and the wall of the cylindrical recess 68 as well as a slight clearance between the outer edges of the block members in order to prevent contact at these points with the possible danger of chipping, breaking or at least straining the metal. It is quite natural to suppose that the block members may be suitably heat treated by any approved process for the purpose of hardening the contacting surfaces so that they will be capable of withstanding wear for a long period of time.

A feature of note is that the vertical axis of the side bearing assemblies and the bearing members coacting therewith is a shorter distance than customary from the vertical axis of the truck so that the four points of support for the car body will be comparatively close to the center of the car, thereby reducing the danger of the load being so frequently carried upon only three bearings. In a way this may detract very slightly from the stability of the car under unusually adverse conditions and to offset this and to provide a safety feature which will prevent excessive lateral motion of the body bolster I provide an abutment member 72 from the top of the truck bolster between the pocket 20 and the end 5, this abutment member having an inclined face 73 adapted to be engaged by a similarly inclined face 74 on a stop member 75 secured on the underside of the body bolster 14.

One or more shims 76 may be interposed between the member 75 and the body bolster for adjusting the position of the former with respect to the stop member 72 so that the surfaces 73 and 74 may on certain occasions engage each other and check any dangerously excessive lateral motion of the body bolster in the operation as will be described.

In the operation, it will be readily understood that under normal circumstances the body bolster 14 is in registration or alinement with the truck bolster 6, the trunnion member 10 and slidable bearing member 8 being in central position with respect to the guide 7 and the side bearing assemblies having their axes extending vertically. When relative swivelling movement of the bolsters occurs the trunnion member 10 forming part of the center plate rotates with the cylindrical opening 9 in the bearing member 8 and the rockers comprising the two members 55 with the blocks 67 enclosed therein rock transversely of the truck end bolster, the curved end surfaces 56 rolling upon the plane confronting surfaces of the rocker members 46. Generally when the relative swivelling movement occurs it is accompanied by lateral motion of the body bolster and at such a time there is not only the pivotal and rocking action above mentioned but also a sliding of the bearing member 8 longitudinally of the truck bolster within the guide 7. Furthermore the curved upper and lower surfaces of the upper and lower rocker members 46, respectively, will then roll against the underside of the bearing member 38 and the top surface 33 of the stationary bearing member 32, respectively. Naturally this cannot take place without a torsional or twisting action somewhere. It is a very important feature of the present invention that this torsional movement takes place within the side bearing assembly so that there will be no great degree of friction developed between the curved surfaces of the rocker members 46 and the coacting bearing members 38 and 32. Actually, one member 55, being prevented from rotation with respect to the member 38 on account of the spuds 52 and 53, will rotate with respect to the other member 55 which cannot rotate with respect to the stationary member 32. The members 55 are themselves out of physical contact as it is only the block members 67 which engage each other. The result is that all the torsional action, and resultant friction, will take place between the curved surface 71 of the projection 70 of one block member and the curved surface 69 in the recess 68 of the other. In view of the fact that these two curved surfaces have different radii, it is apparent that there will really be but a very limited area in actual contact and in this way it is clear that torsional friction will be reduced to the minimum, thereby permitting a very free and easy movement of the truck and body bolsters with respect to each other, during swivelling or lateral motion, or both combined. It should also be observed that as the various spuds 52 and 53 are tapered and of conical and pyramidal shape, respectively, they will have ample clearance within the openings provided for their accommodation so that there will be no possibility of binding and shearing off. Every provision has been made to insure the free and easy movement.

It is intended that the curvature of the surfaces 48 and 50 on the rocker members 46 be such that during the first portion of the travel of the body bolster during lateral motion there will be but a slight lifting action at both ends whereas when the travel increases the lift becomes more abrupt, thereby opposing additional resistance to the lateral motion and checking it before it becomes excessive, resulting in a slam of the parts against one another. If for some reason or other this more abrupt lift should be insufficient to check the lateral motion, for instance as might occur particularly on industrial track where there is a superelevation of the outside rail on a curve, the stop members 72 and 75 will engage and act as a safety factor for preventing an overthrow. The feature of having the vertical axis of the side bearing rockers close to the longitudinal center line of the car has already been discussed and this need not be enlarged upon.

From the foregoing description and a study of the drawings it will be apparent that I have thus provided a very simple and inexpensive and yet highly efficient truck structure which will perform all the functions for which it is intended and which will operate to promote easy riding of the car in point of reduction of shocks, slams, and the like. It is thought that the construction, operation and advantages should be readily apparent to one skilled in the art without further explanation.

While I have shown and described the preferred embodiment of the invention, it should be understood that the disclosure is merely an exemplification of the principles involved as the right is reserved to make all such changes in the details of construction as will widen the field of utility and increase the adaptability of the device provided such changes constitute no departure from the spirit of the invention or the scope of the claims hereunto appended.

Having thus described the invention, I claim:

1. In a truck structure, the combination of a truck bolster, a body bolster mounted thereon for relative swiveling and lateral motion with respect thereto, and side bearing means interposed between the truck and body bolsters and formed as an assembly including top and bottom members capable of rocking movement longitudinally of the bolsters and including interposed swivelly engaged elements rockable together transversely of the bolsters.

2. In a truck structure, the combination of a truck bolster, a body bolster mounted thereon for relative swiveling and lateral motion with respect thereto, and side bearing means interposed between the truck and body bolsters and formed as an assembly including members limited to rocking movement longitudinally of the bolsters and further including members relatively rotatably engaged and limited to rocking movement transversely of the bolsters.

3. In a truck structure, the combination of a truck bolster, a body bolster mounted thereon for relative swiveling and lateral motion with respect thereto, and side bearing means interposed between the truck and body bolsters and formed as an assembly including members rockable longitudinally of the bolsters and further including members relatively rotatably engaged and rockable transversely of the bolsters, said first named members being restrained against rotation with respect to the truck and body bolsters.

4. In a truck structure, the combination of a truck bolster, a body bolster mounted thereon for relative swiveling and lateral motion with respect thereto, and side bearing means interposed between the truck and body bolsters and formed as an assembly including members rockable longitudinally of the bolsters and further including members relatively rotatably engaged and rockable transversely of the bolsters, said first named members being restrained against rotation with respect to the truck and body bolsters and with respect to the second named members.

5. In a truck structure, the combination of a truck bolster, a body bolster mounted thereon for relative swiveling and lateral motion with respect thereto, side bearing means interposed between the truck and body bolsters and formed as an assembly including rocker members rockable longitudinally of the truck and body bolsters and restrained against rotation with respect thereto and further including other members restrained against rotation with respect to the first named members and having relative rotative engagement with each other.

6. In a truck structure, the combination of a truck bolster, a body bolster mounted thereon for relative swiveling and lateral motion with respect thereto, side bearing means interposed between the truck and body bolsters and formed as an assembly including upper and lower rocker members coacting with the body and truck bolsters respectively and rockable longitudinally thereof while restrained against rotary movement with respect thereto, further including retaining members rockably and non-rotatably engaging against said rocker members and movable together transversely of the bolsters, and additionally including block members located within the retaining members and having swivelling engagement.

7. In a truck structure, the combination of a truck bolster, a body bolster mounted thereon for relative swiveling and lateral motion with respect thereto, side bearing means interposed between the truck and body bolsters and formed as an assembly including upper and lower rocker members coacting with the body and truck bolsters respectively and rockable longitudinally thereof while restrained against rotary movement with respect thereto, further including retaining members rockably and non-rotatably engaging against said rocker members and movable together transversely of the bolsters, and additionally including block members located within the retaining members and having swiveling engagement, said block members contacting at relatively small areas compared with their diameter.

8. In a truck structure, the combination of a truck bolster, a body bolster mounted thereon for relative swiveling and lateral motion with respect thereto, side bearing means interposed between the truck and body bolsters and formed as an assembly including upper and lower rocker members coacting with the body and truck bolsters respectively and rockable longitudinally thereof while restrained against rotary movement with respect thereto, further including retaining members rockably and non-rotatably engaging against said rocker members and movable together transversely of the bolsters, and additionally including block members located within the retaining members and having swiveling engagement, said block members having coacting curved surfaces.

9. In a truck structure, the combination of a truck bolster, a body bolster mounted thereon for relative swiveling and lateral motion with respect thereto, side bearing means interposed between the truck and body bolsters and formed as an assembly including upper and lower rocker members coacting with the body and truck bolsters respectively and rockable longitudinally thereof while restrained against rotary movement with respect thereto, further including retaining members rockably and non-rotatably engaging against said rocker members and movable together transversely of the bolsters, and additionally including block members located within the retaining members and having swivelling engagement, said block members having coacting curved surfaces of different radii.

10. In a truck structure, the combination of a truck bolster, a body bolster mounted thereon for relative swiveling and lateral motion with respect thereto, side bearing means interposed between the truck and body bolsters and formed as an assembly including upper and lower rocker members coacting with the body and truck bolsters respectively and rockable longitudinally thereof while restrained against rotary movement with respect thereto, further including retaining members rockably and non-rotatably engaging against said rocker members and movable together transversely of the bolsters, and additionally including block members located within the retaining members and having swivelling engagement, said block members having substantially spherical coacting surfaces, one of less abrupt curvature than the other whereby the area of engagement will be small as compared with the total area of the curved surfaces.

11. In a truck structure, the combination of a truck bolster, a body bolster mounted thereon for relative swiveling and lateral motion with respect thereto, side bearing means interposed between the truck and body bolsters and formed as an assembly including upper and lower rocker members having curved upper and lower surfaces and plane lower and upper surfaces respectively, further including retaining means having a curved upper surface and a curved lower surface coacting with the plane surfaces of said rocker members, and bearing blocks located within said retaining means and having swivelling frictional engagement.

12. In a truck structure, the combination of a truck bolster, a body bolster mounted thereon for relative swiveling and lateral motion with respect thereto, side bearing means interposed between the truck and body bolsters and embodying upper and lower rocker members coacting with the body and truck bolsters respectively, means for preventing rotation of said rocker members with respect to the respective bolsters, a pair of retaining members arranged in end to end relation and having open ends disposed toward each other, said retaining members being relatively rotatable and having interfitting portions and restrained against relative longitudinal movement, the retaining members having rockable engagement with said rocker members and being movable transversely of the bolsters, and swivelly engaged bearing surfaces within the retaining members.

13. In a railway car truck, the combination of a truck bolster formed with a pocket at each side of its vertical axis, a body bolster pivotally and slidably mounted upon the truck bolster and equipped with a depending bearing element above the pocket, said bearing element having an angular opening therein, a stationary bearing member within the pocket having a similar angular opening therein, and a side bearing assembly within each pocket comprising upper and lower rockers provided respectively with spuds entering said first and second named openings, said rocker members coacting respectively with and rockable longitudinally of the bolsters against said depending bearing element and said stationary bearing member, and relatively rotatable members arranged in superposed relation and having bearing surfaces coacting with said rocker members so as to be rockable transversely of the bolsters, and swively engaged bearing members located within said relatively rotatable members.

14. In a truck structure, the combination of a truck bolster, a body bolster mounted thereon for relative swivelling and lateral motion with respect thereto, and noncompressible side bearing rockers interposed between the truck and body bolsters and each embodying vertically coaxial superposed members abuttingly engaged for relative rotation about a vertical axis.

15. In a truck structure, the combination of a truck bolster, a body bolster mounted thereon for relative swivelling and lateral motion with respect thereto, and non-compressible side bearing rockers interposed between the truck and body bolsters and each including retaining means enclosing vertically coaxial longitudinally unyielding elements rotatably abutting for swivelling movement.

16. In a truck structure, the combination of a truck bolster, a body bolster mounted thereon for relative swivelling and lateral motion with respect thereto, and longitudinally non-compressible side bearing rockers interposed between the truck and body bolsters and each embodying rigid relatively rotatable superposed abutting vertically coaxial sections rockable bodily longitudinally of the bolsters.

17. In a truck structure, the combination of a truck bolster, a body bolster mounted thereon for relatively swivelling and lateral motion with respect thereto, and longitudinally non-compressible side bearing rockers interposed between the truck and body bolsters and each embodying longitudinally unyielding relatively rotatable vertically coaxial end to end abutting sections rockable bodily longitudinally of the bolsters and also transversely thereof.

18. In a truck structure, the combination of a truck bolster, a body bolster mounted thereon for relative swivelling and lateral motion with respect thereto, and side bearing rockers interposed between the truck and body bolsters and each formed as a longitudinally rigid or non-compressible assembly capable of rocking movement longitudinally and transversely of the bolsters and each including enclosed swively engaged coaxial elements at its thrust receiving coacting surfaces.

THOMAS H. SYMINGTON.